(12) United States Patent
Murchie

(10) Patent No.: US 8,438,816 B2
(45) Date of Patent: May 14, 2013

(54) COMPOSITE PANEL

(76) Inventor: John Murchie, Langley (CA)

( * ) Notice: Subject to any disclaimer, the term of this patent is extended or adjusted under 35 U.S.C. 154(b) by 122 days.

(21) Appl. No.: 12/257,231

(22) Filed: Oct. 23, 2008

(65) Prior Publication Data

US 2010/0101182 A1    Apr. 29, 2010

(51) Int. Cl.
*E04C 2/34* (2006.01)

(52) U.S. Cl.
USPC ....... 52/794.1; 52/309.7; 52/309.9; 52/406.1; 52/677

(58) Field of Classification Search .......... 52/309.4, 52/309.7, 309.9, 309.16, 784.1, 784, 15, 52/794.1, 407.1, 677–689; 428/71
See application file for complete search history.

(56) References Cited

U.S. PATENT DOCUMENTS

| | | | | |
|---|---|---|---|---|
| 3,295,278 | A * | 1/1967 | Muhm | 52/223.6 |
| 3,679,529 | A * | 7/1972 | Prusinski | 428/57 |
| 3,755,063 | A * | 8/1973 | Massey et al. | 428/215 |
| 3,855,376 | A * | 12/1974 | Ono et al. | 264/46.1 |
| 3,898,780 | A * | 8/1975 | Beer | 52/302.3 |
| 4,012,882 | A | 3/1977 | Juriss et al. | |
| 4,463,043 | A * | 7/1984 | Reeves et al. | 428/68 |
| 4,476,661 | A | 10/1984 | Hoofe, III | |
| 4,726,973 | A * | 2/1988 | Thompson | 428/45 |
| 5,404,687 | A * | 4/1995 | Blake et al. | 52/600 |
| 5,493,839 | A | 2/1996 | Sax et al. | |
| 5,633,063 | A | 5/1997 | Lause et al. | |
| 6,026,629 | A * | 2/2000 | Strickland et al. | 52/794.1 |
| 6,363,674 | B1 * | 4/2002 | Carver | 52/309.8 |
| 6,412,243 | B1 * | 7/2002 | Sutelan | 52/309.7 |
| 6,729,090 | B2 * | 5/2004 | Messenger et al. | 52/309.12 |
| 2001/0041256 | A1 * | 11/2001 | Heilmayr | 428/318.6 |
| 2003/0024189 | A1 * | 2/2003 | Hughes et al. | 52/271 |
| 2003/0165706 | A1 | 9/2003 | Abbott et al. | |
| 2004/0128947 | A1 | 7/2004 | Ito et al. | |
| 2005/0284100 | A1 * | 12/2005 | Ashuah et al. | 52/794.1 |
| 2006/0230706 | A1 * | 10/2006 | Skendzic et al. | 52/794.1 |
| 2007/0227087 | A1 | 10/2007 | Nasr et al. | |
| 2007/0256379 | A1 * | 11/2007 | Edwards | 52/309.9 |
| 2008/0148663 | A1 * | 6/2008 | Peede et al. | 52/309.9 |
| 2009/0068439 | A1 * | 3/2009 | Callahan et al. | 428/319.7 |
| 2009/0113820 | A1 * | 5/2009 | Deans | 52/169.14 |

FOREIGN PATENT DOCUMENTS

| | | |
|---|---|---|
| CA | 2085945 | 6/1993 |
| CA | 2646268 | 4/2010 |
| EP | 4130622 A1 * | 3/1993 |
| GB | 2 278 625 A | 7/1994 |
| GB | 2 321 267 A | 7/1998 |
| JP | 11022141 A * | 1/1999 |
| KR | 2004073420 A * | 7/2004 |
| WO | WO 9417258 A1 * | 8/1994 |
| WO | WO 02/09934 A1 | 2/2002 |
| WO | WO 2004/074026 A2 | 9/2004 |
| WO | WO 2008/051723 A2 | 5/2008 |

* cited by examiner

*Primary Examiner* — Brian Glessner
*Assistant Examiner* — Adriana Figueroa
(74) *Attorney, Agent, or Firm* — Cameron IP

(57) ABSTRACT

A composite panel comprises an outer skins and an inner core. The inner core includes a frame, an elastomeric material disposed between at least a portion of the frame and the outer skin, and a foamed polymer filler. Also disclosed is a method of manufacturing the same.

11 Claims, 8 Drawing Sheets

COMPOSITE PANEL

BACKGROUND OF THE INVENTION

1. Field of the Invention

The present invention relates to composite panels and, in particular, to a composite panel with improved miscellaneous load bearing capabilities.

2. Description of the Related Art

Composite panels are well known. U.S. Pat. No. 5,633,063 issued on May 27, 2007 to Lause et al. and U.S. patent application Ser. No. 11/800,705 published on Nov. 8, 2007 to Edwards both disclose composite panels and methods of manufacturing the same. Conventional composite panels generally comprise an inner foam core disposed between a pair of rigid outer skins. The foam core is secured to the skins by an adhesive or through mechanical means. The composite panel may be used to construct buildings and other structures.

Conventional composite panels rely primarily on their outer skins for strength. When a load is applied to the panel, outer portions of the panel are subject to high tensile and compression forces. Inner portions of the panel are subject to progressively less tensile and compression forces the closer they are to a neutral axis of the panel. This allows the inner core to be formed from lighter, cheaper materials such as foamed polymer. However, if the outer skins become cracked, or otherwise damaged, the integrity of the panel may be compromised under stress. There is accordingly a need for a composite panel with improved load bearing capabilities.

SUMMARY OF THE INVENTION

It is an object of the present invention to provide an composite panel with improved load bearing capabilities. In particular, it is an object of the present invention to provide a composite panel having an internal frame to improve the load bearing capability of the panel.

In one embodiment the composite panel comprises an outer skins and an inner core. The inner core includes a frame, an elastomeric material disposed between at least a portion of the frame and the outer skin, and a foamed polymer filler.

In a preferred embodiment the composite panel comprises an acrylonitrile butadiene styrene outer skin and an inner core. The inner core includes a steel frame having tubular frame members, an elastomeric material disposed between at least a portion of the frame and the outer skin, and a polyurethane filler. The outer skin has a ceramic coating.

A method of manufacturing the composite panel includes the steps of:
(a) constructing a frame;
(b) constructing an outer skin cavity to receive the frame;
(c) securing an elastomeric spacer to the outer skin cavity;
(d) securing the frame to the elastomeric spacer; and
(e) filling the area in the outer skin cavity not occupied by the frame or elastomeric spacer with a foamed polymer filler.

The composite panel may be used in a variety of applications including but not limited to the construction of buildings, scaffolding systems, formwork systems, fences, highway barriers, decks, and docks. The composite panel may also be used to form component parts of lightweight vehicles including sunroofs, automobile doors, truck boxes, train boxcars, shipping containers, boat hulls, etc. Other applications may include the use of the composite panel as part of an article of furniture such as a counter, bookcase, desk, table, or chair; or as part of an appliance such as a refrigerator or walk in freezer.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
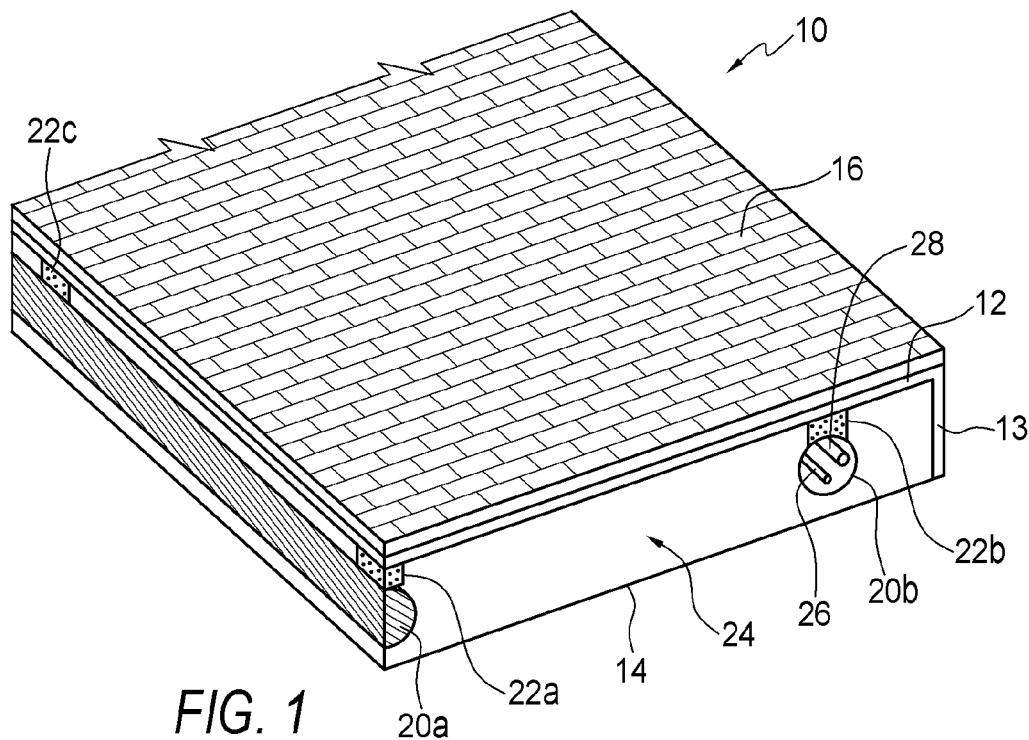
FIG. 1 is a perspective end view showing a section of an improved composite building panel.
Figure 2:
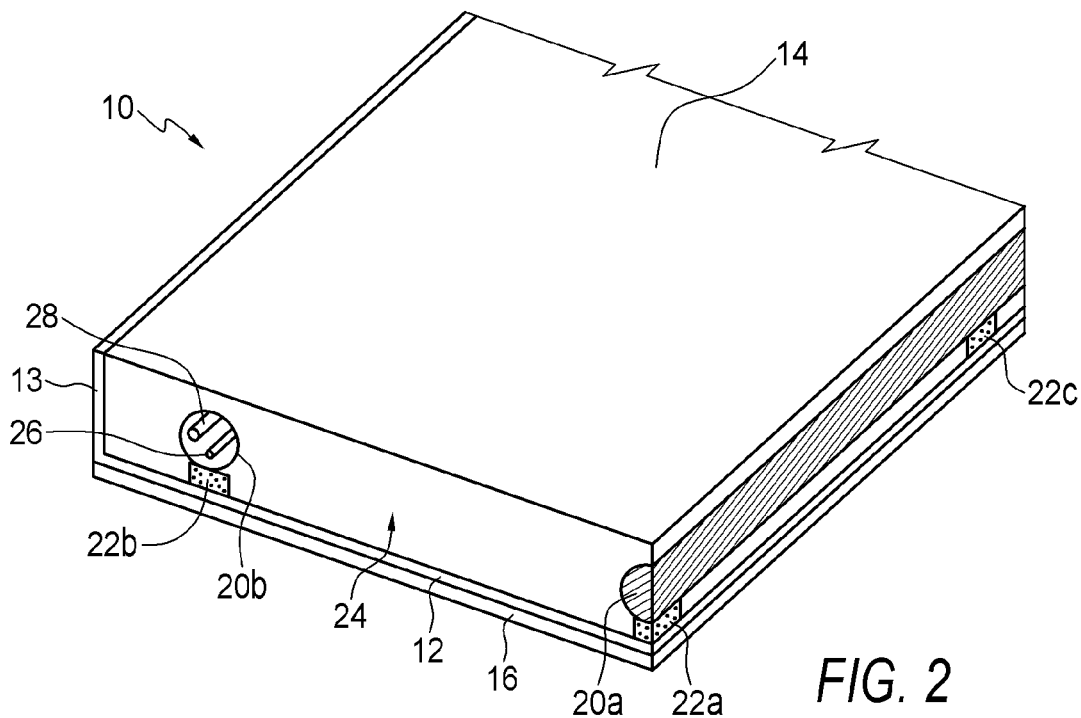
FIG. 2 is another perspective end view showing a section of the composite building panel of FIG. 1.
Figure 5:
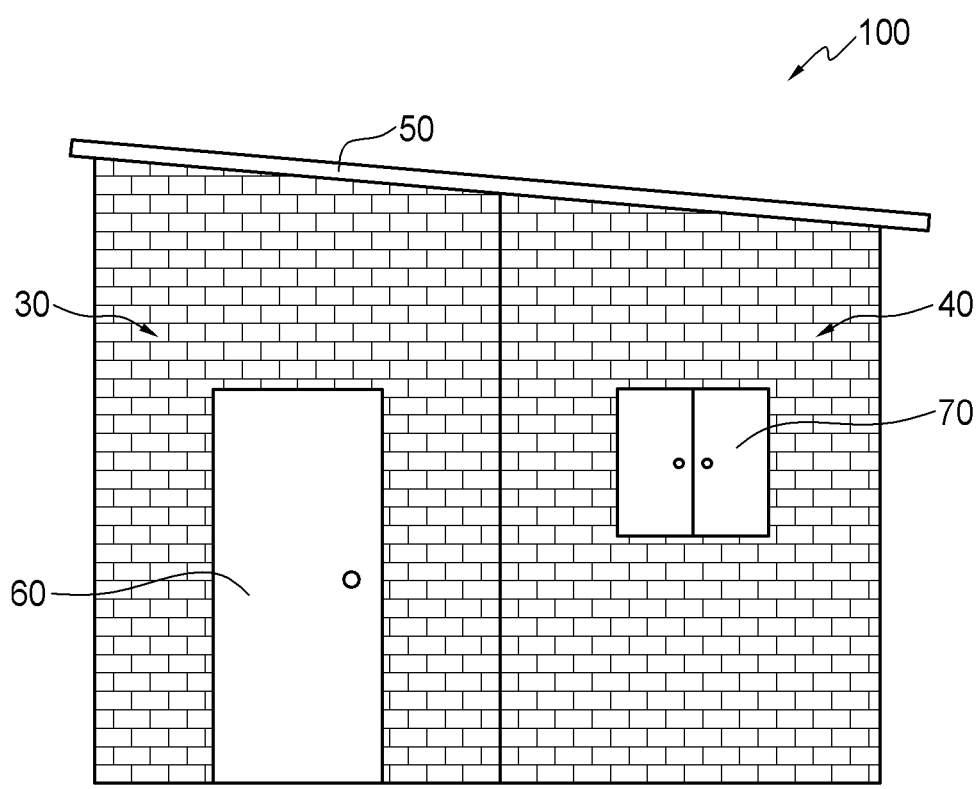
FIG. 5 is an elevation front view of a building comprising the composite panels of FIGS. 2 and 3.

Referring to the drawings and first to FIGS. 1 and 2, these show a section of an improved composite panel 10. The panel 10 has a rigid outer skin 12 which, in this example, is vacuum formed from acrylonitrile butadiene styrene. The outer skin 12 has a web 13 extending along its peripheral edges thereby forming a cavity. A coating 16 may be applied to the outer skin 12 to protect against environmental damage. Suitable interior and exterior ceramic coatings are available from EnviroCoatings (Canada) Inc. of 5730 Production Way, Langley, British Columbia, Canada V3A 4N4. In this example, the outer skin 12 and coating 16 provide a brick profile for use as an exterior facade of a building 100, which is shown in FIG. 5. In other examples, the outer skin 12 and coating 16 may provide other desired profiles including but not limited to siding, stone, and stucco.

An internal frame is defined by a plurality of frame members 20a and 20b disposed within a suitable low cost, light weight foamed polymer filler 24 such as polyurethane. A planar side 14 of the filler 24, which is opposite of the outer skin 12, may provide a profile suitable for an interior wall of the building 100 which is shown in FIG. 5. As shown in FIGS. 1 and 2, the there is at least one elastomeric stopper 22a and 22b disposed between each frame member 20a and 20b and the outer skin 12. Preferably however there are a plurality of elastomeric spacers disposed between the frame members and the outer skin. In the drawings a second elastomeric 22c stopper is shown disposed between one of the frame members 20a and the outer skin 12.

The frame members 20a and 20b each respectively abut the elastomeric spacers 22a and 22b, 22c. The elastomeric spacers 22a, 22b, and 22c, in turn, each abut the outer skin 12. This allows loads to be transferred from the outer skin 12 to the frame members 20a and 20b. The elastomeric spacers 22a, 22b, and 22c also ensure that minimal force is exerted on the outer skins 12 as the frame members 20a and 20b undergo thermal expansion in response to changes in temperature. The elastomeric spacers 22a, 22b, and 22c also ensure that no noise is deflected during thermal expansion. Together the frame members 20a and 20b, the elastomeric spacers 22a, 22b, and 22c, and foamed polymer 24 define an inner core of the panel 10.

The frame members may be metal or steel rods similar to frame member 20a. However, the frame members are preferably tubular similar to frame member 20b. This allows for modular slip-in installation of electrical and plumbing systems during construction of the building 100. As shown in FIG. 1, electrical wiring 26 and water pipes 28 may be received by the tubular frame member 20c. In preferred embodiments, tubular frame members have a wall thickness of 0.049 to 0.250 inches schedule 40 steel. Mild steel, galvanized steel, or stainless steel tubing may be used. The tubes may be rounded or squared depending on load requirements.

Embodiments of the composite panel disclosed herein have been shown to possess desirable load bearing capabilities. In one example, using 0.090 inch schedule 40 steel tubing, a sample composite panel measuring 48 inches by 89 inches by 2.75 inches was subject to flexural and axial loading tests by Tony Nairn, Professional Engineer, of British Columbia, Canada. During the flexural loading test the sample composite panel was placed horizontally on supports 83 inches apart, and loaded with steel and concrete weights until the mid span deflection reached 1.875 inches at which point it was judged that bending failure was imminent. The total load applied was 1,026 lbs. When the weights were removed there was a residual deflection of 0.5 inches. Calculations indicated that the equivalent wind pressure, applied uniformly over the surface of the composite panel, would be approximately 52.7 lbs per square foot. A wind speed of approximately 140 miles per hour is required to exert a pressure of 52.7 lbs per square foot. If heavier gauge tubing is used, higher wind protection can be accepted.

During the axial loading test, the sample composite panel was vertically set in a test frame and evenly loaded along its top 48 inch edge by a hydraulic jack, whose hydraulic oil supply pipe was fitted with a pressure gauge for calculating the force applied at the top edge of the sample composite panel. Measurements were taken at mid height to determine the degree of buckling as the load was increased. The sample composite panel did not buckle until the load reached 8,000 lbs. At 8,640 lbs, the mid height buckling was measured at 2.25 inches outwards from the straight position. This was judged to be the "effective failure load".

In another example, another sample composite panel measuring 24 inches by 48 inches by 4 inches was subject to flexural and axial loading tests by Intertek Testing Services NA Ltd. now of 1500 Brigantine Drive, Coquitlam, British Columbia, Canada V3K 7C1. During this flexural loading test the composite panel laid horizontally, supported at both ends, and load was applied across mid panel. A 3.5 inch timber was placed at mid span and centered. A 0.375 inch by 4 inch steel plate was placed across the sample composite panel to produce even loading. A load was applied using a 10,000 psi pressure gauge and ram, and measured using a 5000 lb calibrated load cell with a measurement uncertainty of 1.78%. Deflection measurements were taken during loading. The sample composite panel achieved load of 395 lbs and deflection was recorded at 0.22 inches. No structural failure, visible cracks, or delamination occurred during this test.

The same equipment was used to perform the axial loading test. The sample panel was vertically set in a reaction frame and the 0.375 inch by 4 inch steel plate was placed across a top edge of the composite panel spanning both width and length. The loading apparatus described above was used to apply a load to the composite panel to a maximum of 4496 lbs. There was no sign of structural failure or permanent deformation in the sample composite panel.

The above tests show that embodiments of the composite panel disclosed herein can withstand high wind speeds when used as building walls. Furthermore, the axial strength of the composite panel provides adequate support for loads from a roof or even additional building stories.

Figure 3:
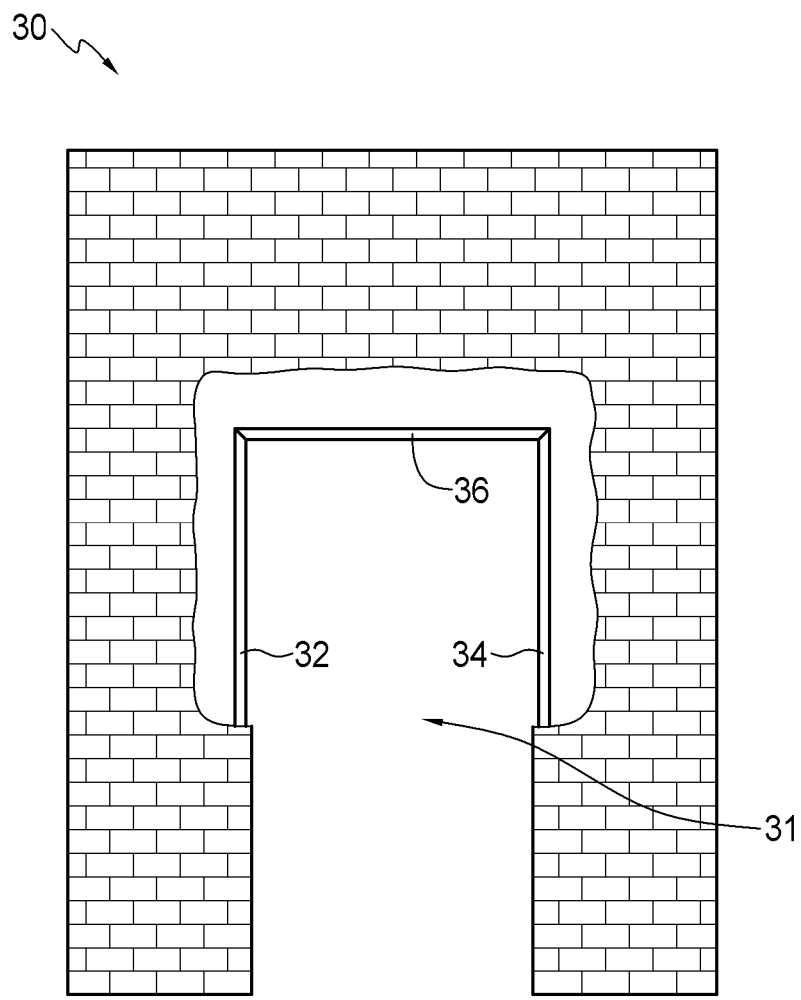
FIG. 3 is an elevation front view of an improved composite panel having an opening shaped in the form of a door.
Figure 4:
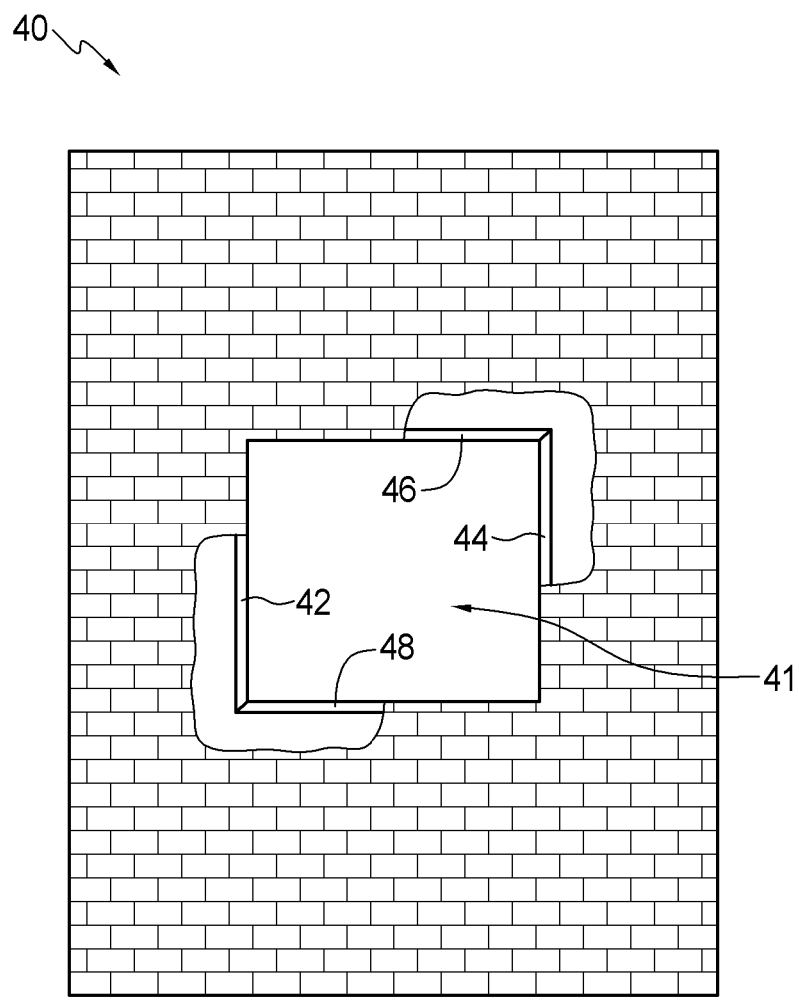
FIG. 4 is an elevation front view of an improved composite panel having an opening shaped in the form of a window.

Referring now to FIGS. 3 and 4, individual composite panels 30 and 40 similar to the type shown in FIGS. 1 and 2 are shown. In FIG. 3, a composite panel 30 is provided with an opening 31 which is in the shape of a door. The opening 31 is provided with mouldings 32, 34, and 36 which are disposed on the outer skin. This allows for a door (not shown) to be directly hinged to the composite panel 30. In FIG. 4, a composite panel 40 is provided with an opening 41 which is in the shape of a window. The opening 41 is provided with mouldings 42, 44, 46, and 48 which are disposed on the outer skin. This allows for a window shutter (not shown) to be directly hinged to the composite panel 40. As shown in FIG. 5, the composite panels 30 and 40 may be used in the construction of the building 100. The openings 31 and 41 of each of the panels 30 and 40 is provided with a either a door 60 or window shutter 70, as required, without the need for further processing.

In this example, the composite panels 30 and 40 are truncated to allow for a pitched roof 50. This simplified structure is ideal for rain drainage and/or collection in tropical climates found in many parts of the developing world. However, in other examples, the building 100 may be provided with any type of roof, flat or gabled, and even multiple stories. The roof 50 and remaining external walls (not shown) are also formed from composite panels similar to the type disclosed herein. The floor is preferably a concrete foundation slab but may also be formed from composite panels similar to the type disclosed herein. Any suitable interior divider may be used.

Construction of buildings using the composite panels disclosed herein is fast, inexpensive, and simple to teach. Furthermore, specialized labour is not required for either the construction of the building or the manufacture of the panels. Since the composite panels possess desired flexural and axial strength as well as other desired physical properties, the buildings are ideal for use in all types of climatic conditions because of their thermal, water, wind, and earthquake resistance. The buildings have long term durability and usability. The composite panels weigh approximately 100 lbs each and have a 200 year life cycle.

Figure 6:
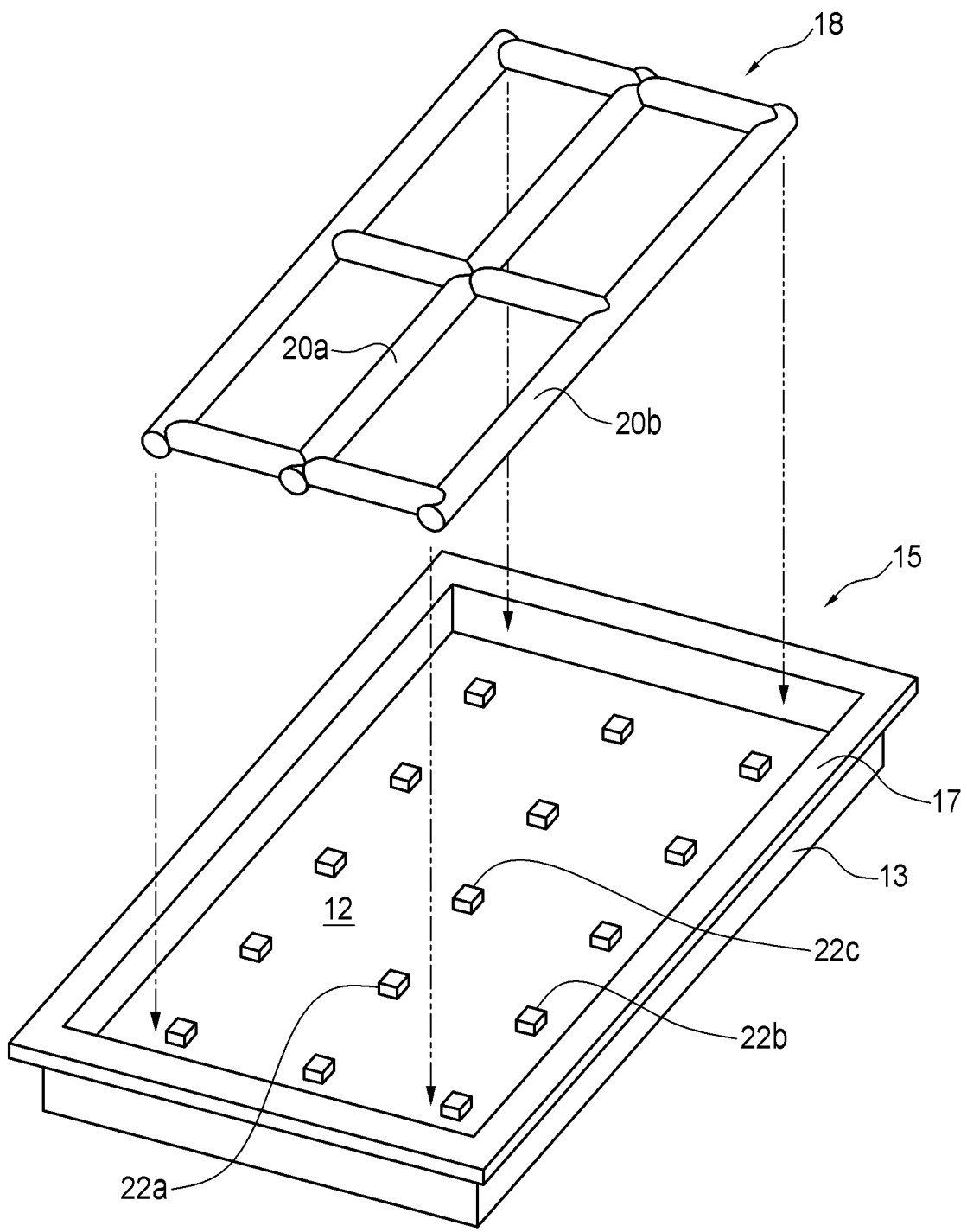
FIG. 6 is a perspective exploded view showing a frame and an outer skin cavity used to manufacture the composite building panel of FIG. 1.
Figure 7:
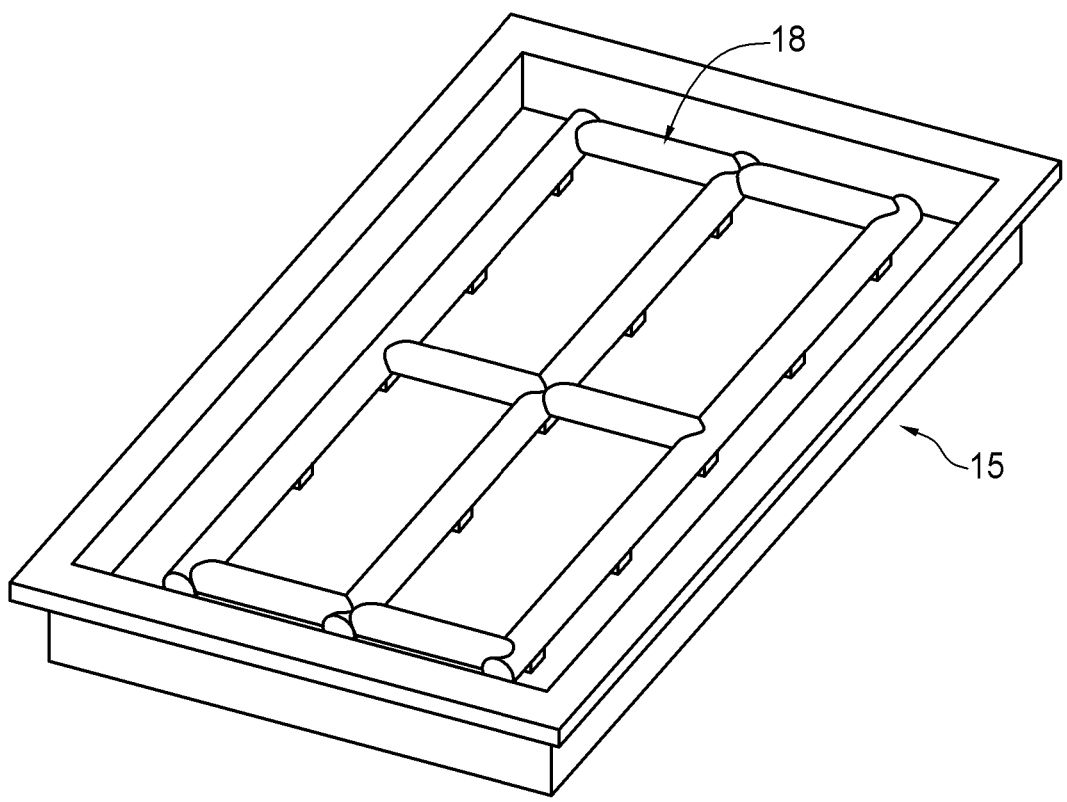
FIG. 7 a perspective view showing the frame married to the outer skin cavity during the manufacture the composite building panel of FIG. 1.

Referring to FIGS. 6 and 7, the first step in a manufacturing composite a panel, used in the construction of buildings, is producing the vacuum moulds used to form the acrylonitrile butadiene styrene cavity 15 which defines the outer skin 12 and web 13 thereof In this example, there also is a lip 17 on which extends along the web 13. Any desired profile may be provided on the outer skin 12 including but not limited to brick, siding, stone, and stucco. The profile may alternatively be smooth or embedded with customized artwork or designs. A suitable frame 18 is then formed by welding solid and/or tubular frame members 20a and 20b. A jig can be used to set up the frame for welding with wire hand held or robotic production welding. The frame 18 may be coated with a non-corrosive material to protect against oxidation.

A plurality of elastomeric spacers 22a, 22b and 22c are secured to an inner face of the outer skin 12 in a configuration to match the frame 18. The outer skin 12 is wiped down with acetone, to provide good adhesive properties, prior to the frame being placed in the cavity 15. The frame 18 is then glue welded to the elastomeric spacers 22*a*, 22*b* and 22*c*. Preferably the elastomeric spacers 22*a*, 22*b* and 22*c* maintain a spacing of 0.25 to 0.375 inches between the frame 18 and the outer skin 12. This allows for foamed polymer to flow freely between the frame 18 and the outer skin 12. In this example, the web 13 is 3 inches high creating a cavity 15 which has sufficient volume to create a R22 insulation rating when filled with foamed polymer.

Figure 8:
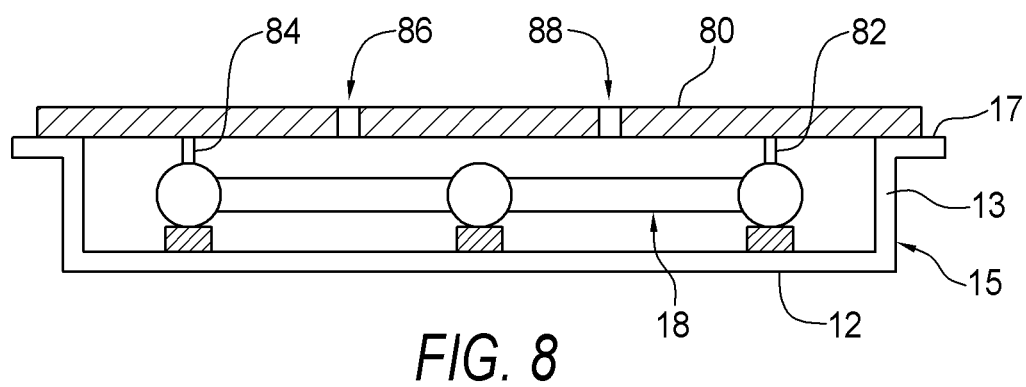
FIG. 8 is sectional view showing a metal plate used when the outer skin cavity is filled with foamed polymer during the manufacture of the composite building panel of FIG. 1.

As shown in FIG. 8, once the marriage of the frame 18 to the outer skin 12 is complete, the assembly is placed in an adjustable squaring compression chamber and the remaining area in the cavity is filled with a suitable foamed polymer. Using a foamed polymer having a 3 lb density generates pressure of approximately 2.08 psi. A ¾ inch steel plate 80 reinforced with angle steel is rested on the lip 17 of the cavity 15, and is bolted to the frame 18, using keeper screws compression 82 and 84, before foam rises. The keeper screws 82 and 84 also keep the frame 18 from moving in the cavity 15. Holes drilled 86 and 88 in the steel plate 80 release surplus foam. In this example, the foamed polymer used is polyurethane. After the foam is set, the composite panel can get a final trim to the desired dimensions. The lip 17 is also trimmed after the foam is set. The side the composite panel, where foam is exposed, may be coated with an acrylic or epoxy for weatherproofing.

Figure 9:
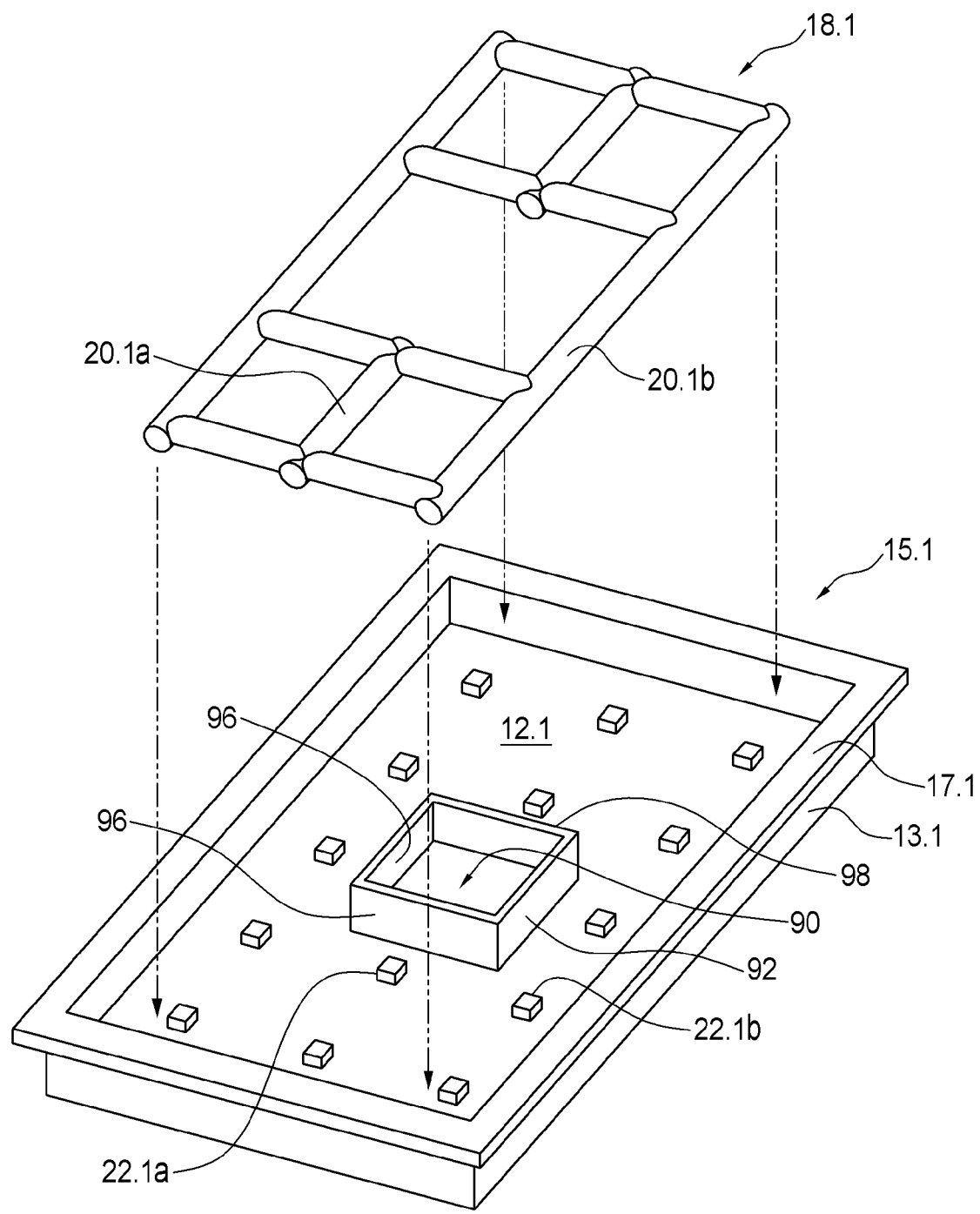
FIG. 9 is a perspective exploded view showing a frame and an outer skin cavity used to manufacture the composite building panel of FIG. 4.

Referring now to FIG. 9, when forming a composite panel with an opening for a door or window, acrylonitrile butadiene styrene cavity 15.1 is formed with the opening 90. In FIG. 9 like parts have been given like reference numerals as in FIGS. 6 and 7 with the additional numerical designation ".1". Mouldings 92, 94, 96 and 98 are formed directly on the cavity 15.1 to allow a window to be hinged directly to the finished panel. The panel is then manufactured as described above.

In the construction of a building, galvanized or stainless steel channels are secured to the concrete foundation slab which is the floor of the building. The channels receive the composite panels which are then attached to one another using a water based adhesive. The composite panels are held in place by expandable pipe clamps until they are secured to the channels using screws. The composite panels are preferably secured to the channels using 3/16 inch drill screws with a pull apart strength of 3000 lbs. This should be sufficient to withstand hurricane winds while still providing flexibility in earthquakes. In larger applications welded steel framing may be used to receive the composite panels. Coatings can be applied to the surfaces of the secured composite panels to improve the aesthetics of the building. The entire process is environmentally friendly and produces very little waste all of which is recyclable.

It will be understood by a person skilled in the art that although in this example the composite panel disclosed herein is used in the construction industry that may be used in other applications in transportation and manufacturing industries.

It will further be understood by a person skilled in the art that many of the details provided above are by way of example only, and are not intended to limit the scope of the invention which is to be determined with reference to following claims.

What is claimed is:

1. A composite panel comprising:
an outer skin; and
an inner core, the inner core including a frame, a plurality of elastomeric spacers maintaining a spacing between the frame and the outer skin, and a foamed polymer filler between the frame and the outer skin;
wherein the foamed polymer filler is set around the elastomeric spacers so there is no air gap between the frame and the outer skin and the elastomeric spacers minimize forces exerted on the outer skin as the frame undergoes thermal expansion.

2. The composite panel as claimed in claim 1 wherein the frame includes tubular frame members.

3. The composite panel as claimed in claim 1 wherein the frame is a steel frame.

4. The composite panel as claimed in claim 1 wherein the outer skin is formed from acrylonitrile butadiene styrene.

5. The composite panel as claimed in claim 1 wherein the foamed polymer filler is polyurethane.

6. The composite building panel as claimed in claim 1 further including a ceramic coating on the outer skin.

7. A composite panel comprising:
an acrylonitrile butadiene styrene outer skin; and
an inner core, the inner core including a steel frame having tubular frame members, a plurality of elastomeric spacers maintaining a spacing between the frame and the outer skin, and a polyurethane filler between the frame and the outer skin;
wherein the polyurethane filler is set around the elastomeric spacers so there is no air gap between the frame and the outer skin and the elastomeric spacers minimize forces exerted on the outer skin as the frame undergoes thermal expansion.

8. The composite building panel as claimed in claim 7 further including a ceramic coating on the outer skin.

9. The composite building panel as claimed in claim 1 wherein the elastomeric spacers are secured to the outer skin.

10. The composite building panel as claimed in claim 7 wherein the elastomeric spacers are secured to the outer skin.

11. A building comprising the composite panel of claim 1.

* * * * *